(12) United States Patent
Rumler (10) Patent No.: US 10,668,892 B2
(45) Date of Patent: Jun. 2, 2020

(54) VEHICLE SEAT WITH DUAL SHOULDER STRAP SEAT BELTS

(71) Applicant: E.V.S. Ltd., South Bend, IN (US)

(72) Inventor: Thomas C. Rumler, Marcellus, IN (US)

(73) Assignee: E.V.S. Ltd., South Bend, IN (US)

(*) Notice: Subject to any disclaimer, the term of this patent is extended or adjusted under 35 U.S.C. 154(b) by 0 days.

(21) Appl. No.: 15/493,488

(22) Filed: Apr. 21, 2017

(65) Prior Publication Data

US 2018/0304851 A1    Oct. 25, 2018

(51) Int. Cl.
| | |
|---|---|
| *B60R 22/26* | (2006.01) |
| *B60R 22/34* | (2006.01) |
| *B60N 2/68* | (2006.01) |
| *B60R 22/18* | (2006.01) |
| *B60N 2/20* | (2006.01) |

(52) U.S. Cl.
CPC .............. *B60R 22/26* (2013.01); *B60N 2/688* (2013.01); *B60R 22/34* (2013.01); *B60N 2/20* (2013.01); *B60R 2022/1818* (2013.01)

(58) Field of Classification Search
CPC ..................................................... B60R 22/26
USPC ......................................................... 297/484
See application file for complete search history.

(56) References Cited

U.S. PATENT DOCUMENTS

| | | |
|---|---|---|
| 3,659,895 A | 5/1972 | Dresden |
| 3,747,723 A | 7/1973 | Peterson et al. |
| 3,860,283 A | 1/1975 | Colautti |
| 4,227,670 A | 10/1980 | Vander Burgh et al. |
| 4,270,798 A | 6/1981 | Harder, Jr. |
| 4,312,539 A | 1/1982 | Takada |
| 4,341,399 A | 7/1982 | Thomas |
| 4,455,046 A | 6/1984 | Linderoth |
| 4,591,208 A * | 5/1986 | McDonald ........... B60N 2/2806 297/216.11 |
| 4,600,239 A | 7/1986 | Gerstein et al. |
| 4,652,053 A * | 3/1987 | Mikami ................. B60R 22/20 297/483 |
| 4,653,809 A | 3/1987 | Czernakowski et al. |
| 4,705,256 A | 11/1987 | Hofrichter |
| 4,834,452 A | 5/1989 | Goodrich |

(Continued)

FOREIGN PATENT DOCUMENTS

| | | |
|---|---|---|
| CA | 2757492 A1 | 10/2010 |
| DE | 4015966 A1 | 6/1991 |

(Continued)

*Primary Examiner* — Timothy J Brindley
(74) *Attorney, Agent, or Firm* — Barnes & Thornburg LLP (57) ABSTRACT

A vehicle seat includes a seat bottom, a seat back, a first seat belt retractor, a second seat belt retractor, a first seat belt shoulder strap and a second seat belt shoulder strap. The seat bottom includes an upper side, a lower side, a front side, a back side, a right side and a left side. The seat back includes a front side, a back side, an opening extending between the front side and the back side, a left side, a right side, an upper edge and a lower edge. The first and second seat belt retractors are connected to the back side of the seat back. The first seat belt shoulder strap has a first end connected to the first seat belt retractor and a second end connected to the left side of the seat back. The second seat belt shoulder strap has a first end connected to the second seat belt retractor and a second end connected to the right side of the seat back.

12 Claims, 6 Drawing Sheets

(56) References Cited

U.S. PATENT DOCUMENTS

| | | | | |
|---|---|---|---|---|
| 4,840,402 | A | 6/1989 | Yamamoto et al. | |
| 4,938,502 | A | 7/1990 | Yamamoto et al. | |
| 4,971,392 | A | 11/1990 | Young | |
| 5,082,328 | A | 1/1992 | Garelick | |
| 5,141,249 | A | 8/1992 | Saitoh et al. | |
| 5,161,765 | A | 11/1992 | Wilson | |
| 5,183,312 | A | 2/1993 | Nania | |
| 5,263,763 | A | 11/1993 | Billette | |
| 5,292,179 | A | 3/1994 | Forget | |
| 5,380,062 | A | 1/1995 | Nania | |
| 5,482,354 | A | 1/1996 | Gryp | |
| 5,584,460 | A | 12/1996 | Ropp | |
| 5,702,157 | A | 12/1997 | Hurite | |
| 5,720,462 | A | 2/1998 | Brodersen | |
| 5,853,221 | A | 12/1998 | Thoman et al. | |
| 5,918,903 | A | 7/1999 | Ito | |
| 5,957,499 | A | 9/1999 | Kempf | |
| 6,053,532 | A | 4/2000 | Wilkins et al. | |
| 6,139,111 | A * | 10/2000 | Pywell | B60N 2/0705 297/484 |
| 6,209,960 | B1 | 4/2001 | Bradbury | |
| 6,367,882 | B1 * | 4/2002 | Van Druff | B60R 22/12 297/467 |
| 6,412,876 | B2 | 7/2002 | Nishide | |
| 6,652,032 | B2 | 11/2003 | Laval | |
| 6,655,743 | B1 | 12/2003 | Parizat et al. | |
| 6,662,426 | B2 | 12/2003 | Ito | |
| 6,666,514 | B2 | 12/2003 | Muraishi et al. | |
| 6,752,462 | B1 | 6/2004 | Kain et al. | |
| 6,769,716 | B2 * | 8/2004 | Rouhana | B60R 22/02 280/801.1 |
| 6,871,876 | B2 | 3/2005 | Xu | |
| 6,948,776 | B1 | 9/2005 | Harmon et al. | |
| 6,964,084 | B2 | 11/2005 | Ito | |
| 7,434,833 | B2 | 10/2008 | Kore | |
| D585,355 | S | 1/2009 | Harmon et al. | |
| 7,513,575 | B1 | 4/2009 | Go | |
| 8,002,348 | B2 * | 8/2011 | Jessup | B60N 2/24 297/216.1 |
| 8,302,995 | B2 * | 11/2012 | Xu | B60R 21/0136 280/806 |
| 8,419,127 | B1 * | 4/2013 | Wilhelm | B60R 22/02 280/808 |
| 8,550,566 | B2 | 10/2013 | Wada | |
| 8,632,131 | B2 * | 1/2014 | Humbert | B60R 22/40 297/477 |
| 8,651,525 | B2 | 2/2014 | Kaku et al. | |
| 8,684,414 | B1 * | 4/2014 | McBride | B60R 22/02 280/801.1 |
| 8,783,782 | B2 * | 7/2014 | Park | B60N 2/688 297/475 |
| 8,939,465 | B2 | 1/2015 | Kastelic et al. | |
| 8,998,326 | B2 | 4/2015 | DeCraene et al. | |
| 9,004,586 | B2 | 4/2015 | DeCraene et al. | |
| 9,254,818 | B2 | 2/2016 | Vitet | |
| 9,561,777 | B2 | 2/2017 | Bell | |
| 9,610,870 | B2 | 4/2017 | Pos | |
| 2003/0071511 | A1 * | 4/2003 | Stafford | B60N 2/2812 297/484 |
| 2003/0137180 | A1 * | 7/2003 | Rouhana | B60R 22/26 297/484 |
| 2004/0012242 | A1 * | 1/2004 | White | B60R 22/02 297/484 |
| 2004/0036345 | A1 * | 2/2004 | Herberg | B60R 22/02 297/480 |
| 2005/0073187 | A1 * | 4/2005 | Frank | B60R 22/02 297/484 |
| 2005/0206152 | A1 * | 9/2005 | Delventhal | B60R 21/01516 280/805 |
| 2006/0103229 | A1 * | 5/2006 | Fransen | B60N 2/2812 297/484 |
| 2006/0108848 | A1 | 5/2006 | Williamson et al. | |
| 2008/0018156 | A1 * | 1/2008 | Hammarskjold | B60N 2/688 297/354.1 |
| 2008/0143158 | A1 * | 6/2008 | Roodenburg | A63G 7/00 297/284.4 |
| 2008/0258527 | A1 * | 10/2008 | Gower | B60N 2/2812 297/256.15 |
| 2009/0322067 | A1 * | 12/2009 | Nezaki | B60R 2/002 280/807 |
| 2010/0078908 | A1 * | 4/2010 | Pos | B62B 9/24 280/47.38 |
| 2010/0207433 | A1 * | 8/2010 | Hahn | B60N 2/24 297/216.1 |
| 2014/0042793 | A1 * | 2/2014 | Fiore | B60N 2/2812 297/484 |
| 2015/0183396 | A1 * | 7/2015 | Humbert | B60R 22/4619 242/389 |
| 2016/0016534 | A1 * | 1/2016 | Nagasawa | B60R 22/12 297/465 |
| 2017/0021795 | A1 * | 1/2017 | Gallagher | B60N 2/24 |
| 2018/0079341 | A1 * | 3/2018 | Nishimura | B60N 2/688 |
| 2018/0201375 | A1 * | 7/2018 | Browning | B64D 11/062 |

FOREIGN PATENT DOCUMENTS

| | | |
|---|---|---|
| DE | 19612979 A1 | 10/1996 |
| EP | 0005908 A1 | 12/1979 |
| EP | 0546896 A1 | 6/1993 |
| GB | 2481564 B | 4/2014 |
| GB | 2508522 B | 10/2014 |
| WO | 2010114966 A1 | 10/2010 |

* cited by examiner

VEHICLE SEAT WITH DUAL SHOULDER STRAP SEAT BELTS

The present invention relates to a vehicle seat and in particular to a vehicle seat having two seat belt shoulder straps.

SUMMARY OF THE INVENTION

In one embodiment of the present invention, a vehicle seat includes a seat bottom, a seat back, a first seat belt retractor, a second seat belt retractor, a first guide, a second guide a first seat belt shoulder strap and a second seat belt shoulder strap. The seat bottom has an upper side, a lower side, a front side, a back side, a right side and a left side. The seat back is connected to the seat bottom and has a front side, a back side, an opening extending between the front side and the back side, a left side, a right side, an upper edge and a lower edge positioned adjacent the back side of the seat bottom. The first seat belt retractor is connected to the back side of the seat back and is positioned closer to the left side of the seat back than it is to the right side of the seat back. The second seat belt retractor is connected to the back side of the seat back and is positioned closer to the right side of the seat back than it is to the left side of the seat back. The first guide is connected to the back side of the seat back adjacent the opening in the seat back and the second guide connected to the back side of the seat back adjacent the opening in the seat back. The a first seat belt shoulder strap has a first end connected to the first seat belt retractor and a second end connected to the left side of the seat back. The first seat belt shoulder strap extends through the first guide and through the opening in the seat back. The second seat belt shoulder strap has a first end connected to the second seat belt retractor and a second end connected to the right side of the seat back. The second seat belt shoulder strap extends through the second guide and through the opening in the seat back.

In one embodiment, the vehicle seat further includes a third seatbelt retractor connected to the seat, a seat belt buckle connected to the seat and a seat belt lap strap. The seat belt lap strap has a first end connected to the third seat belt retractor and a second end connected to a latch configured to engage the seat belt buckle.

In another embodiment of the present invention, a vehicle seat includes a seat bottom, a seat back, a first seat belt retractor, a second seat belt retractor, a first seat belt shoulder strap and a second seat belt shoulder strap. The seat bottom includes an upper side, a lower side, a front side, a back side, a right side and a left side. The seat back includes a front side, a back side, an opening extending between the front side and the back side, a left side, a right side, an upper edge and a lower edge. The first and second seat belt retractors are connected to the back side of the seat back. The first seat belt shoulder strap has a first end connected to the first seat belt retractor and a second end connected to the left side of the seat back. The second seat belt shoulder strap has a first end connected to the second seat belt retractor and a second end connected to the right side of the seat back.

In one embodiment, the first seat belt retractor is positioned closer to the left side of the seat back than it is to the right side of the seat back and the second seat belt retractor is positioned closer to the right side of the seat back than it is to the left side of the seat back.

In another embodiment, the vehicle seat further includes a first guide connected to the seat back. The first seat belt shoulder strap may extend through the first guide. The vehicle seat may also include a second guide connected to the seat back and the second seat belt shoulder strap may extend through the second guide.

In one embodiment, the first and second seat belt shoulder straps extend through the opening in the seat back.

In yet another embodiment of the present invention, the vehicle seat further includes a third seat belt retractor connected to the seat, a seat belt buckle connected to the seat and a seat belt lap strap. The seat belt lap strap has a first end connected to the third seat belt retractor and a second end connected to a latch configured to engage the seat belt buckle.

In another embodiment of the present invention, a vehicle seat includes a seat bottom, a seat back, a first seat belt retractor, a second seat belt retractor, a first guide, a second guide, a third guide, a fourth guide, a first seat belt shoulder strap and a second seat belt shoulder strap. The seat bottom has an upper side, a lower side, a front side, a back side, a right side and a left side. The seat back is connected to the seat bottom and has a front side, a back side, an opening extending from the front side to the back side, a left side, a right side, an upper edge and a lower edge positioned adjacent the back side of the seat bottom. The first seat belt retractor is connected to the back side of the seat back and the second seat belt retractor is connected to the back side of the seat back. The first and second guides are connected to the back side of the seat back. The third guide is connected to the right side of the seat back and the fourth guide is connected to the left side of the seat back. The first seat belt shoulder strap has a first end connected to the first seat belt retractor and a second end connected to the back side of the seat back. The second seat belt shoulder strap has a first end connected to the second seat belt retractor and a second end connected to the back side of the seat back.

In one embodiment of the invention, the first seat belt retractor is positioned closer to the left side of the seat back than it is to the right side of the seat back and the second seat belt retractor is positioned closer to the right side of the seat back than it is to the left side of the seat back.

In other embodiments, the first seat belt shoulder strap extends through the first guide, the opening in the seat back and/or the fourth guide.

In another embodiment, the second seat belt shoulder strap extends through the second guide, the opening in the seat back and/or the third guide.

In another embodiment of the invention, the vehicle seat further includes a third seat belt retractor connected to the seat, a seat belt buckle connected to the seat and a seat belt lap strap. The seat belt lap strap has a first end connected to the third seat belt retractor and a second end connected to a latch configured to engage the seat belt buckle.

DETAILED DESCRIPTION OF THE EMBODIMENTS OF THE INVENTION

Figure 1:
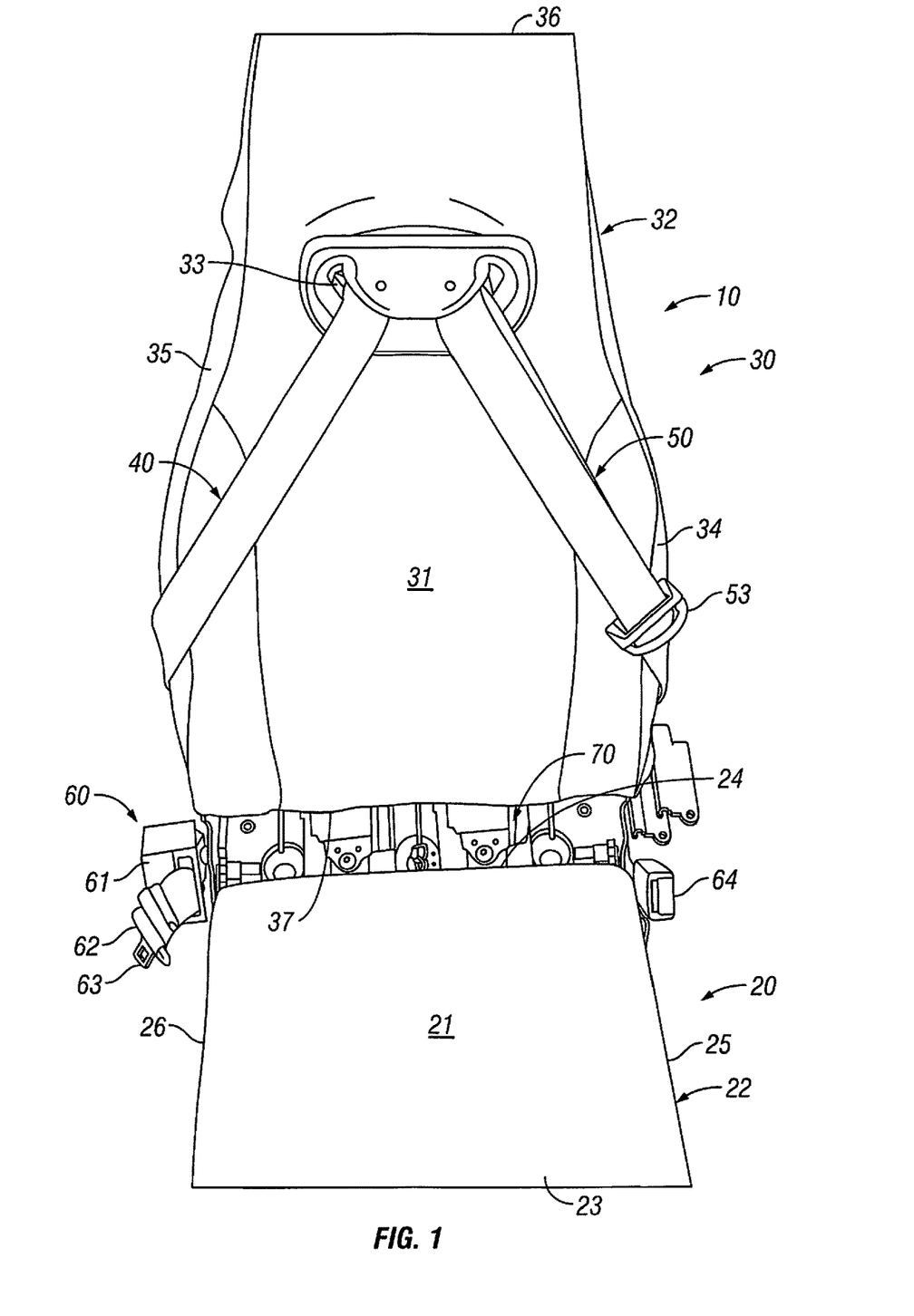
FIG. 1 is a front perspective view of a vehicle seat with dual shoulder straps illustrating two embodiments of the present invention.
Figure 2:
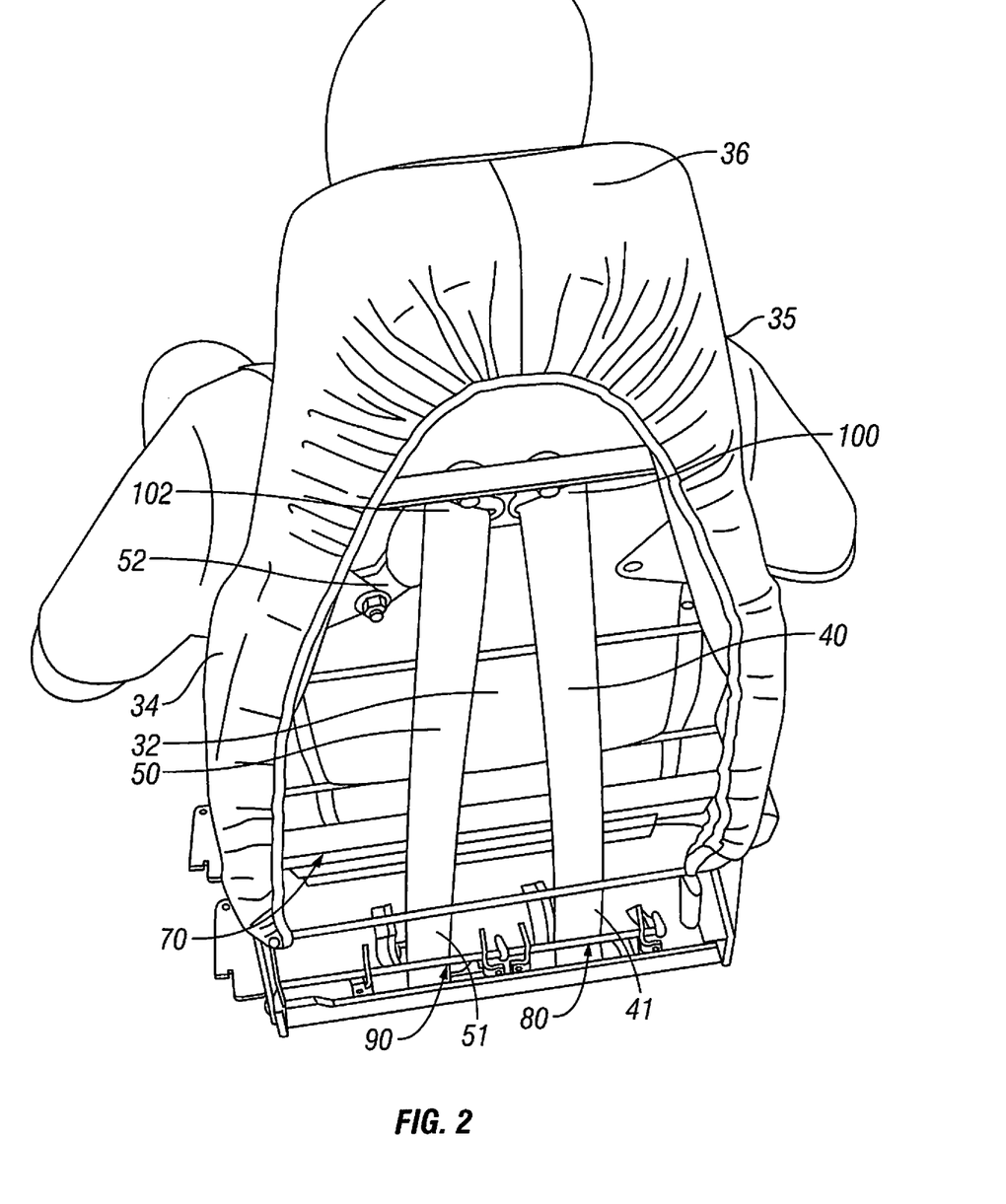
FIG. 2 is a rear perspective view of the vehicle seat shown in FIG. 1.

Referring to FIGS. 1 and 2, a vehicle seat 10 includes a seat bottom 20, a seat back 30, a first seat belt shoulder strap 40, a second seat belt shoulder strap 50, a lap belt assembly 60, a frame 70, a first seat belt retractor 80 and a second seat belt retractor 90.

Seat bottom 20 includes an upper side 21, a lower side 22 positioned beneath and generally parallel to upper side 21, a front side 23, a back side 24, a right side 25 and a left side 26.

Seat back 30 includes a front side 31, a back side 32, an opening 33 extending between front side 31 and back side 32, a right side 34, a left side 35, an upper edge 36 and a lower edge 37. Seat back 30 is connected to seat bottom 20 by frame 70 such that lower edge 37 of seat back 30 is adjacent back side 24 of seat bottom 20. In certain embodiments, seat back 30 may recline with respect to seat bottom 20 as is known in the art.

Referring to FIG. 2, first seat belt retractor 80 is positioned closer to left side 35 of seat back 30 than is second seat belt retractor 90. Second seat belt retractor 90 is positioned closer to right side 34 of seat back 30 than is first seat belt retractor 80.

Figure 3:
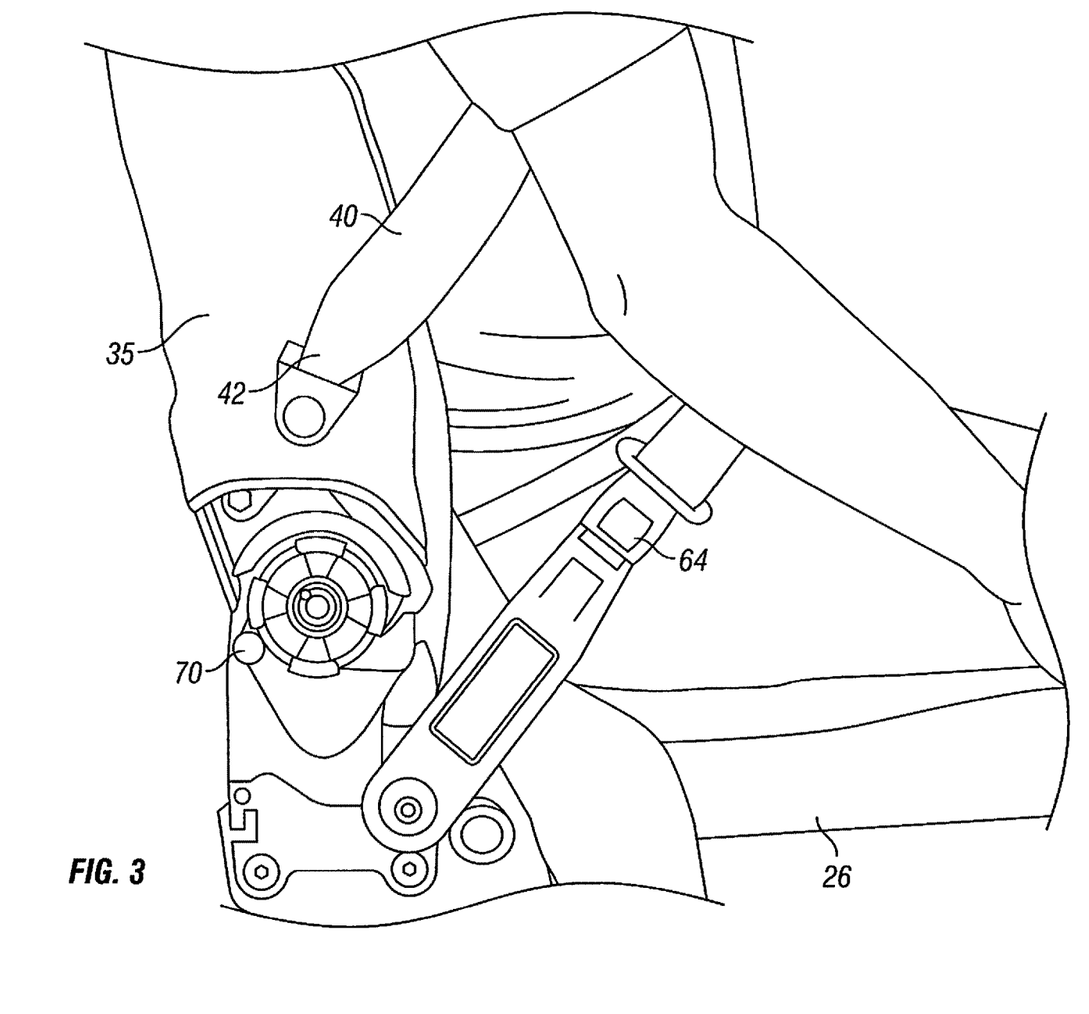
FIG. 3 is a left side elevational view of the vehicle seat shown in FIG. 1.
Figure 4:
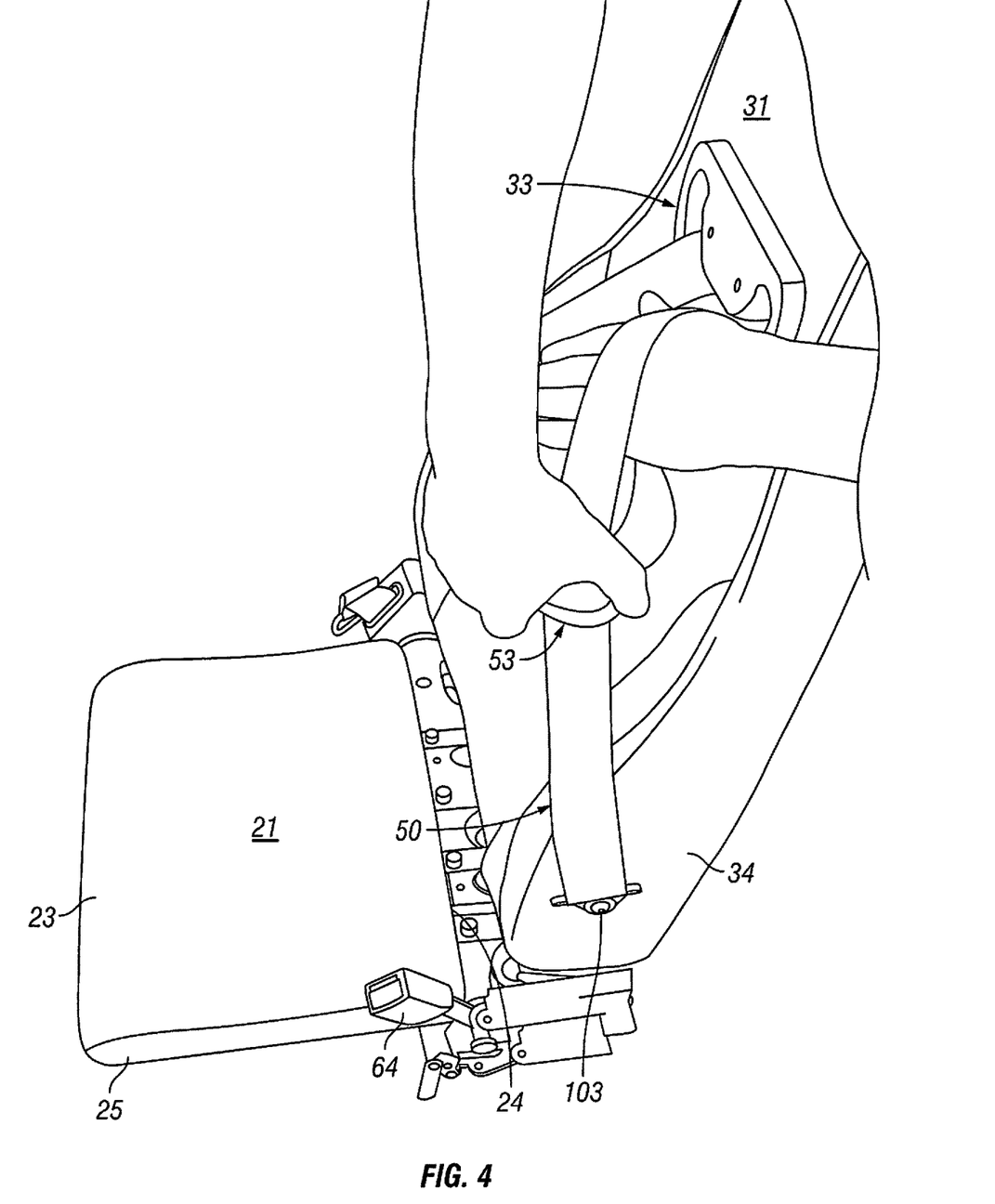
FIG. 4 is a right side perspective view of the vehicle seat shown in FIG. 1.

First seat belt shoulder strap 40 has a first end 41 connected to first seat belt retractor 80. Seat 10 further includes a first guide 100 and a second guide 102, both of which are secured to back 32 of seat back 30 adjacent opening 33. First seat belt shoulder strap 40 extends from first seat belt retractor 80 through first guide 100, through opening 33, across a portion of front side 31 of seat back 30 and is secured at its second end 42 to left side 35 of seat back 30, as shown in FIG. 3.

Second seat belt shoulder strap 50 can have the same configuration as described with respect to first seat belt shoulder strap 40. Alternatively, as shown in FIGS. 1 and 2, another embodiment may be utilized. Specifically, second seat belt shoulder strap 50 in the embodiment shown has a first end 51 connected to second seat belt retractor 90. Second seat belt shoulder strap 50 extends through second guide 102, through opening 33 in seat back 30, through a third guide 103 secured to right side 34 of seat back 30, back through opening 33 and second guide 102 and is secured at its second end 52 to back side 32 of seat back 30. In this embodiment, second seat belt shoulder strap 50 is also provided with a seat belt shoulder strap adjuster 53 which may be used to adjust second seat belt shoulder strap 50 as is known in the art. Note that if the configuration of seat belt shoulder strap 50 were used on both sides of seat 10, a fourth guide (not shown) would be connected to left side 35 of seat back 30.

Lap belt assembly 60 includes a third seat belt retractor 61 connected to frame 70, a seat belt lap strap 62 having a latch 63 connected to one end thereof and a seat belt buckle 64 connected to seat frame 70 on the opposite side of seat 10. Latch 63 is configured to engage seat belt buckle 64 as is known in the art. Note that seat belt retractor 61 could be positioned on the right side of seat 10 and seat belt buckle 64 could be positioned on the left side of seat 10, as shown in FIG. 3.

Figure 5:
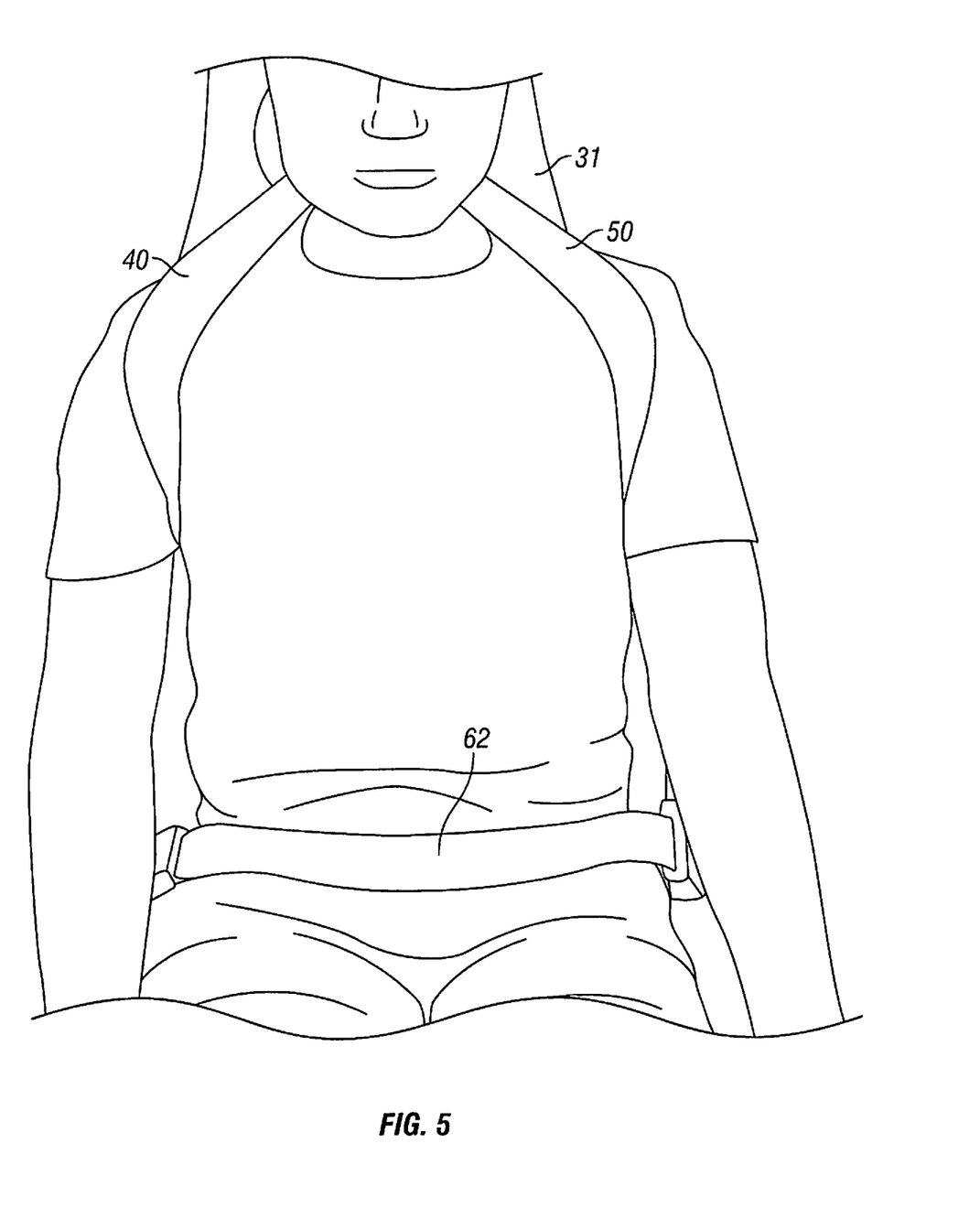
FIG. 5 illustrates the manner in which a user is secured in the vehicle seat shown in FIG. 1.

In use, the user sits on seat bottom 20 and extends his or her hands and arms between front side 31 of seat back 30 and first and second seat belt shoulder straps 40 and 50. In this manner, the user is restrained by two seat belt shoulder straps without the need to engage a seat belt latch and buckle mechanism. If desired, the user may also optionally engage latch 63 with seat belt buckle 64 to provide further restraint with lap belt assembly 60. Note that with the present invention, seat belt shoulder straps 40 and 50 are positioned over the user's shoulders and under the user's arms and do not cross the user's chest. (FIG. 5)

Figure 6:
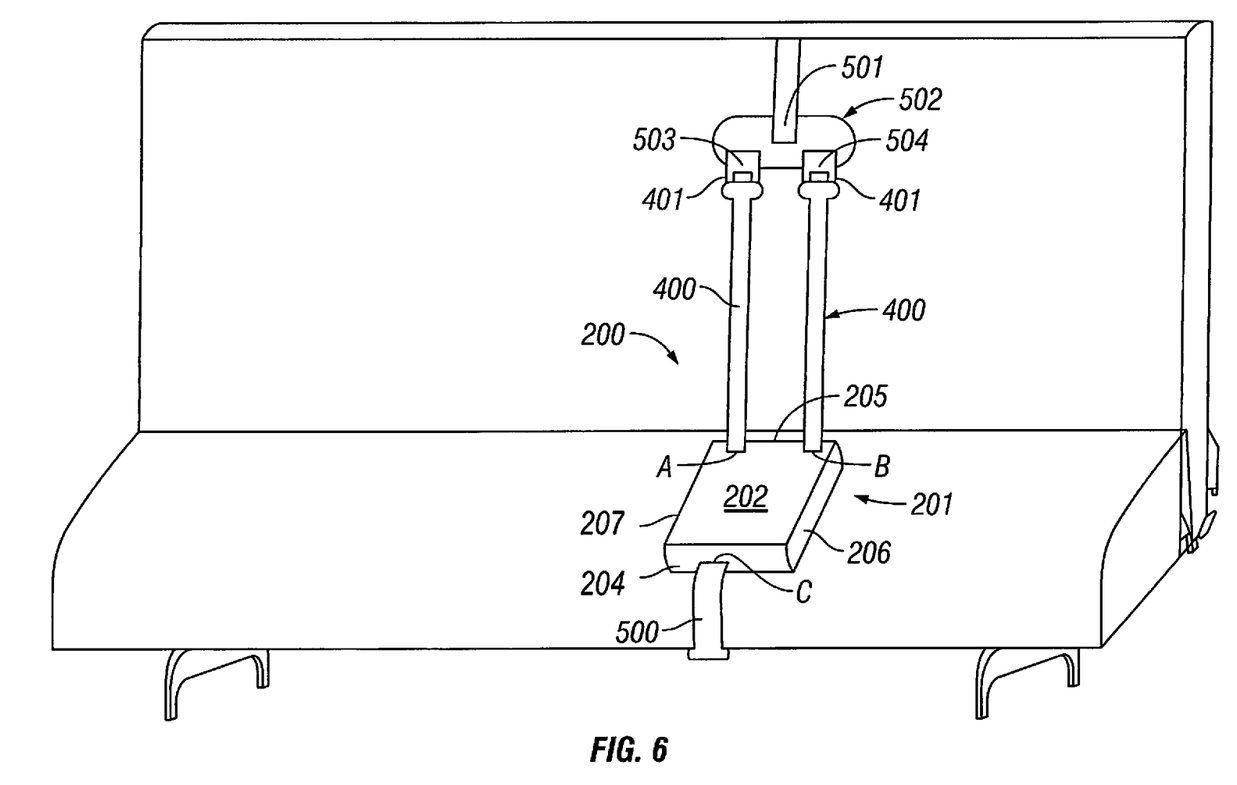
FIG. 6 illustrates a vehicle seat with dual shoulder straps according to another embodiment of the invention.

FIG. 6 illustrates an alternative embodiment of the present invention. In this embodiment seat 200 is installed on a preexisting seat, such as a bench type seat as is often found in school busses, for example. Seat 200 includes a seat bottom 201 having an upper side 202, a lower side 203 positioned beneath and generally parallel to upper side 202, a front side 204, a back side 205, a right side 206 and a left side 207. A first seat belt retractor (not shown) is connected to or located within seat bottom 201 at location A. A second seat belt retractor (not shown) is connected to or located within seat bottom 201 at location B. A third seat belt retractor (not shown) is connected to or located within seat bottom 201 at location C. A first seat belt shoulder strap 400 has a first end connected to the first seat belt retractor and a second end 401 connected to a seat belt latch. A second seat belt shoulder strap 400 has a first end connected to the second seat belt retractor and a second end 401 connected to a seat belt latch. A securing strap 500 has a first end connected to the third seat belt retractor and a second end 501 connected to a member 502 having first and second seat belt buckles 503 and 504.

Seat 200 is secured to the preexisting seat by positioning seat bottom 201 on the seat, extending second end 501 and member 502 of securing strap 500 under the preexisting seat, around the back, over the top edge and engaging latches 401 on seat belt shoulder straps 400 with seat belt buckles 503 and 504. If the preexisting seat includes a lap belt or other securing device, it may also be used to secure seat 200 to the preexisting seat. A user is secured in seat 200 in the same manner as described above with respect to seat 10.

Although the present invention has been shown and described in detail the same is to be taken by way of example only and not by way of limitation. Numerous changes can be made to the embodiments described without departing from the scope of the invention. For example, the invention can be applied to seats other than they types shown and described above.

The invention claimed is:

1. A vehicle seat, including:
    a seat bottom having an upper side, a lower side, a front side, a back side, a right side and a left side;
    a seat back connected to the seat bottom, the seat back having a front side, a back side, an opening extending between the front side and the back side, a left side, a right side, an upper edge and a lower edge positioned adjacent the back side of the seat bottom;
    a first seat belt retractor connected to the back side of the seat back and a second seat belt retractor connected to the back side of the seat back, the first seat belt retractor positioned closer to the left side of the seat back than it is to, the right side of the seat back and the second seat belt retractor positioned closer to the right side of the seat back than it is to the left side of the seat back;
    a first guide connected to the back side of the seat back adjacent the opening in the seat back and a second guide connected to the back side of the seat back adjacent the opening in the seat back;
    a first seat belt shoulder strap having a first end connected to the first seat belt retractor and a second end directly connected to the left side of the seat back, the first seat belt shoulder strap extending through the first guide and through the opening in the seat back; and a second seat belt shoulder strap having a first end connected to the second seat belt retractor and a second end directly connected to the right side of the seat back, the second seat belt shoulder strap extending through the second guide and through the opening in the seat back.

2. The vehicle seat according to claim 1, further including:
a third seatbelt retractor connected to the seat;
a seat belt buckle connected to the seat; and
a seat belt lap strap, the seat belt lap strap having a first end connected to the third seat belt retractor and a second end connected to a latch configured to engage the seat belt buckle.

3. A vehicle seat, including:
a seat bottom having an upper side, a lower side, a front side, a back side, a right side and a left side;
a seat back having a front side, a back side, an opening extending between the front side and the back side, a left side, a right side, an upper edge and a lower edge;
a first seat belt retractor connected to the back side of the seat back and a second seat belt retractor connected to the back side of the seat back;
a first seat belt shoulder strap extending through the opening in the seat back, the first seat belt shoulder strap having a first end connected to the first seat belt retractor and a second end directly connected to the left side of the seat back; and
a second seat belt shoulder strap extending through the opening in the seat back, the second seat belt shoulder strap having a first end connected to the second seat belt retractor and a second end directly connected to the right side of the seat back.

4. The vehicle seat according to claim 3, wherein the first seat belt retractor is positioned closer to the left side of the seat back than it is to the right side of the seat back and the second seat belt retractor is positioned closer to the right side of the seat back than it is to the left side of the seat back.

5. The vehicle seat according to claim 3, further including a first guide connected to the seat back.

6. The vehicle seat according to claim 5, wherein the first seat belt shoulder strap extends through the first guide.

7. The vehicle seat according to claim 6, further including a second guide connected to the seat back.

8. The vehicle seat according to claim 7, wherein the second seat belt shoulder strap extends through the second guide.

9. The vehicle seat according to claim 3, further including:
a third seat belt retractor connected to the seat;

a seat belt buckle connected to the seat;
a seat belt lap strap, the seat belt lap strap having a first end connected to the third seat belt retractor and a second end connected to a latch configured to engage the seat belt buckle.

10. A vehicle seat, including:
a seat bottom having an upper side, a lower side, a front side, back side, a right side and a left side;
a seat back connected to the seat bottom, the seat back having a front side, a back side, an opening extending from the front side to the back side, a left side, a right side, an upper edge and a lower edge positioned adjacent the back side of the seat bottom;
a first seat belt retractor connected to the back side of the seat back and a second seat belt retractor connected to the back side of the seat back;
a first guide connected to the back side of the seat back, a second guide connected to the back side of the seat back, a third guide connected to the right side of the seat back and a fourth guide connected to the left side of the seat back;
a first seat belt shoulder strap having a first end and a second end, the first end connected to the first seat belt retractor, the first seat belt shoulder strap extending from the first seat belt retractor, through the first guide, through the opening in the seat back, through the fourth guide and back through the opening in the seat back, the second end connected to the back side of the seat back; and
a second seat belt shoulder strap having a first end and a second end, the first end connected to the second seat belt retractor, the second seat belts shoulder strap extending from the second seat belt retractor, through the second guide, through the opening in the seat back, through the third guide and back through the opening in the seat back, the second end connected to the back side of the seat back.

11. The vehicle seat according to claim 10, wherein the first seat belt retractor is positioned closer to the left side of the seat back than it is to the right side of the seat back and the second seat belt retractor is positioned closer to the right side of the seat back than it is to the left side of the seat back.

12. The vehicle seat according to claim 10, further including:
a third seat belt retractor connected to the seat;
a seat belt buckle connected to the seat;
a seat belt lap strap, the seat belt lap strap having a first end connected to the third seat belt retractor and a second end connected to a latch configured to engage the seat belt buckle.

* * * * *